US010343668B2

(12) United States Patent
Fulton et al.

(10) Patent No.: US 10,343,668 B2
(45) Date of Patent: Jul. 9, 2019

(54) APPARATUS FOR MOUNTING AN AIR DISC BRAKE ACTUATOR

(71) Applicant: HENDRICKSON USA, L.L.C., Itasca, IL (US)

(72) Inventors: R. Scott Fulton, Hudson, OH (US); Jeffrey R. Wittlinger, Uniontown, OH (US); John E. Ramsey, Canton, OH (US); Donald R. Hester, East Canton, OH (US); Benedetto Naples, Canton, OH (US); Matthew Karich, Fairlawn, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 59 days.

(21) Appl. No.: 15/453,028

(22) Filed: Mar. 8, 2017

(65) Prior Publication Data
US 2017/0259800 A1 Sep. 14, 2017

Related U.S. Application Data

(60) Provisional application No. 62/305,603, filed on Mar. 9, 2016.

(51) Int. Cl.
F16D 65/00 (2006.01)
B60T 17/08 (2006.01)
(Continued)

(52) U.S. Cl.
CPC ............ *B60T 17/088* (2013.01); *B60B 35/00* (2013.01); *B60B 35/001* (2013.01);
(Continued)

(58) Field of Classification Search
CPC ........ B60T 17/088; B60T 1/065; B60T 13/36; B60G 7/001; B60G 2300/026;
(Continued)

(56) References Cited

U.S. PATENT DOCUMENTS 3,837,420 A * 9/1974 Kobelt .................... B60T 1/065
188/264 AA
5,016,912 A 5/1991 Smith
(Continued)

FOREIGN PATENT DOCUMENTS

DE 19632515 A1 4/1998
EP 0440571 A1 8/1991
(Continued)

*Primary Examiner* — Toan C To
(74) *Attorney, Agent, or Firm* — Dureska & Moore, LLC; David P. Dureska; Greg Strugalski

(57) ABSTRACT

An air disc brake system for a heavy-duty vehicle comprising an axle. A spindle is attached to an end portion of the axle. At least a portion of an air disc brake assembly is supported by the spindle. A suspension beam has an axle support portion connectable with the axle. An end portion of the suspension beam is spaced from the axle support portion for attachment with the heavy-duty vehicle. The suspension beam may pivot about the end portion of the suspension beam. An actuator actuates the air disc brake assembly. The actuator has a movable member to actuate the air disc brake assembly. Structure is associated with the suspension beam for supporting at least a portion of the actuator. A surface defines an opening in the suspension beam through which the movable member may extend or that may receive and support a portion of the actuator.

22 Claims, 9 Drawing Sheets

(51) Int. Cl.
  *B60G 7/00* (2006.01)
  *B60T 1/06* (2006.01)
  *B60T 13/36* (2006.01)
  *B60B 35/00* (2006.01)
  *B60B 35/16* (2006.01)
  *F16D 55/00* (2006.01)
(52) U.S. Cl.
  CPC .......... *B60B 35/002* (2013.01); *B60B 35/003* (2013.01); *B60B 35/004* (2013.01); *B60B 35/005* (2013.01); *B60B 35/16* (2013.01); *B60G 7/001* (2013.01); *B60T 1/065* (2013.01); *B60T 13/36* (2013.01); *F16D 55/00* (2013.01); *B60G 2200/32* (2013.01); *B60G 2206/012* (2013.01); *B60G 2206/10* (2013.01); *B60G 2206/50* (2013.01); *B60G 2300/026* (2013.01); *F16D 2055/0008* (2013.01)
(58) Field of Classification Search
  CPC ............ B60G 2206/50; B60G 2206/10; B60G 2206/012; B60G 2200/32
  USPC ........... 280/124.116, 124.128; 188/218, 71.1
  See application file for complete search history.

(56) References Cited

U.S. PATENT DOCUMENTS

| | | | | |
|---|---|---|---|---|
| 6,460,869 | B1* | 10/2002 | Tremouilles | B60G 21/051 280/124.116 |
| 6,471,223 | B1* | 10/2002 | Richardson | B60G 7/001 280/124.116 |
| 9,102,206 | B1 | 8/2015 | Saieg et al. | |
| 9,890,825 | B2* | 2/2018 | White | F16D 65/0081 |
| 2004/0084255 | A1* | 5/2004 | Fisher | B60T 17/081 188/71.1 |
| 2008/0047787 | A1* | 2/2008 | Scheckelhoff | F16D 65/18 188/72.9 |
| 2011/0089660 | A1* | 4/2011 | Dodd | B60G 7/001 280/124.128 |
| 2011/0241866 | A1* | 10/2011 | Todd | B60T 17/088 340/453 |
| 2014/0327220 | A1* | 11/2014 | Holt | B60G 11/28 280/124.116 |
| 2015/0232077 | A1* | 8/2015 | Gaufin | B60T 13/38 188/1.11 R |
| 2016/0010709 | A1 | 1/2016 | Banks | |
| 2017/0100976 | A1* | 4/2017 | Dilworth | B60G 9/022 |

FOREIGN PATENT DOCUMENTS

| | | |
|---|---|---|
| EP | 2650554 A1 | 10/2013 |
| EP | 2653327 A1 | 10/2013 |
| FR | 2589107 A1 | 4/1987 |
| WO | 199809094 A1 | 3/1998 |
| WO | 1998009094 | 3/1998 |
| WO | 200046052 A1 | 8/2000 |
| WO | 2007044928 A1 | 4/2007 |
| WO | 2014066728 A1 | 5/2014 |

\* cited by examiner

APPARATUS FOR MOUNTING AN AIR DISC BRAKE ACTUATOR

CROSS-REFERENCE TO RELATED APPLICATIONS

This application claims the benefit of U.S. Provisional Patent Application Ser. No. 62/305,603 filed on Mar. 9, 2016.

TECHNICAL FIELD

The subject matter of this application generally relates to disc brake systems for heavy-duty vehicles. The subject matter particularly relates to an apparatus for mounting a disc brake actuator remotely from a brake caliper of the disc brake system by structure of an axle/suspension system of the heavy-duty vehicle.

BACKGROUND

Disc brake systems for heavy-duty vehicles are known. Such disc brake systems operate by forcing a pair of opposing brake pads against a rotor to create friction between the pads and the rotor which enables slowing and/or stopping of the vehicle. More particularly, a disc brake system includes a plurality of disc brake assemblies, in which each disc brake assembly is operatively mounted on or adjacent a wheel end of the heavy-duty vehicle.

Typically, each disc brake assembly includes a carrier, which supports a caliper that is described in greater detail below. The carrier is attached to a torque plate, typically by mechanical fasteners, such as bolts. The torque plate in turn is rigidly connected to an axle of an axle/suspension system of the vehicle, such as by welding. The torque plate is located on or adjacent a wheel end of the heavy-duty vehicle. The torque plate resists the torque that is generated during braking, and maintains proper alignment of the carrier and caliper to ensure proper operation of the components of the brake assembly.

The caliper is formed with a bore for receiving one or more pistons and an actuator. The actuator typically has an air chamber, referred to in the art as a brake chamber, which is in fluid communication with a compressed air source and activates movement of the piston(s). The caliper also includes an outboard pad seat that is disposed opposite the piston(s). Each one of a pair of opposing brake pads includes friction material that is mounted on a backing plate, and is seated in the carrier, with one of the pads being adjacent the piston(s) and the other pad being adjacent the outboard pad seat. Upon actuation by the brake chamber, the piston(s) and the outboard pad seat cooperate to control movement of the brake pads.

The rotor includes a disc portion, which is disposed between the brake pads in a manner that allows the friction material of each pad to face a respective one of a pair of surfaces of the disc portion. The rotor also includes a mounting portion that is adapted for mounting to a respective one of the wheel end assemblies of the vehicle by mechanical fasteners, such as bolts. A sleeve typically is integrally formed with and extends between the disc portion of the rotor and the mounting portion of the rotor. This construction enables the rotor to be operatively mounted on the wheel end assembly for rotation and connection to its respective vehicle wheel.

During vehicle travel, when the vehicle brake system is engaged, compressed air flows to the brake chamber, which causes movement of the piston(s), typically through a mechanism, and the outboard pad seat, which in turn forces the friction material of the pads against the disc portion of the rotor, slowing and/or stopping rotation of the rotor, thereby slowing and/or stopping rotation of the vehicle wheel.

The manner in which and where the prior art actuator is mounted has some disadvantages and drawbacks. The prior art actuator was attached directly to the caliper in a cantilevered fashion by a pair of mounting studs, using no other support structure. Such cantilevered mounting of the prior art actuator provides less than optimum support of the actuator, and also undesirably creates stress on the caliper. In addition, in order to enable the caliper to have sufficient strength and rigidity to support such cantilevered mounting configuration of the brake chamber, the size and weight of the caliper must be undesirably increased. The cost corresponding to the manufacture of the caliper, thus, may be undesirably high.

Most prior art actuators are mounted on the inboard side of the caliper. Because of this orientation and the space constraints in a brake system and corresponding axle/suspension system, the prior art actuator and caliper typically are located behind and/or beneath the beam of the axle/suspension system. This location potentially creates an undesirable level of clearance between the prior art actuator and the ground, which could potentially result in the prior art actuator being damaged by hitting the ground or being struck with road debris.

The disadvantages and drawbacks associated with the mounting of prior art actuators make it desirable to develop an improved way to mount actuators on a heavy-duty vehicle. As a result, there is a need for a brake actuator of an air disc brake system for heavy-duty vehicles to be mounted in a manner that provides improved support of the brake actuator and improved protection of the brake chamber, while potentially reducing the size and weight of the caliper. The apparatus for remote mounting of an air disc brake actuator of the subject disclosure satisfies these needs.

SUMMARY

A summary is provided to introduce concepts of the disclosed subject matter in a form that are described in detail below. This summary is not intended to identify key factors or essential features of the disclosed subject matter, nor is it intended to be used to limit the scope of the disclosed subject matter.

The disadvantages and drawbacks associated with the mounting of prior art actuators are overcome with an air disc brake actuator mounting constructed and manufactured according to aspects of the disclosed subject matter. The concepts of the disclosed subject matter provide an air disc brake system for a heavy-duty vehicle that mounts the majority of the weight of a disc brake actuator employing structure of the suspension beam and minimizing the involvement of a brake caliper or carrier for support. The disclosed subject matter is directed to mounting an air disc brake actuator, such as a brake chamber, on a heavy-duty vehicle by components of an axle/suspension system of the heavy-duty vehicle. Such mounting of the brake actuator provides improved support of the brake actuator and improved protection of the brake actuator, while potentially reducing the size and weight of the caliper.

An improved air disc brake system for a heavy-duty vehicle, according to one aspect, includes an axle. A spindle is attached to an end portion of the axle. At least a portion of an air disc brake assembly is supported by the spindle. A suspension beam has an axle support portion connectable with the axle. An end portion of the suspension beam is spaced from the axle support portion and is for attachment with the heavy-duty vehicle. The suspension beam may pivot about the end portion of the suspension beam. An actuator actuates the air disc brake assembly. Structure is associated with the suspension beam for supporting at least a portion of the actuator.

The suspension beam has a surface defining an opening for receiving and supporting a brake chamber of the actuator. The actuator has a movable member to actuate the air disc brake assembly. The suspension beam of the air disc brake system has a surface defining an opening through which the movable member may extend to actuate the air disc brake assembly upon movement. The movable member extends in substantially the same direction as the extent of the axle. The majority of the weight of the actuator is supported with minimal involvement of the air disc brake assembly, especially during application of the brake according to one aspect.

The structure for supporting the actuator is located between the axle support portion and the end portion of the suspension beam. At least a portion of the actuator may be located on a first side of the suspension beam and at least a portion of the air disc brake assembly may be located on an opposite second side of the suspension beam. The suspension beam may have an inverted U-shape cross-section. The suspension beam may have a rectangular cross-section.

DRAWINGS

The following description and drawings set forth certain illustrative aspects and implementations of the disclosed subject matter. These are indicative of but a few of the various ways in which one or more aspects or implementations that concepts of the disclosed subject matter may be employed. Further features and advantages of the disclosed subject matter will become apparent to those skilled in the art from reading the following description with reference to the accompanying drawings, in which.

DESCRIPTION

Figure 1:
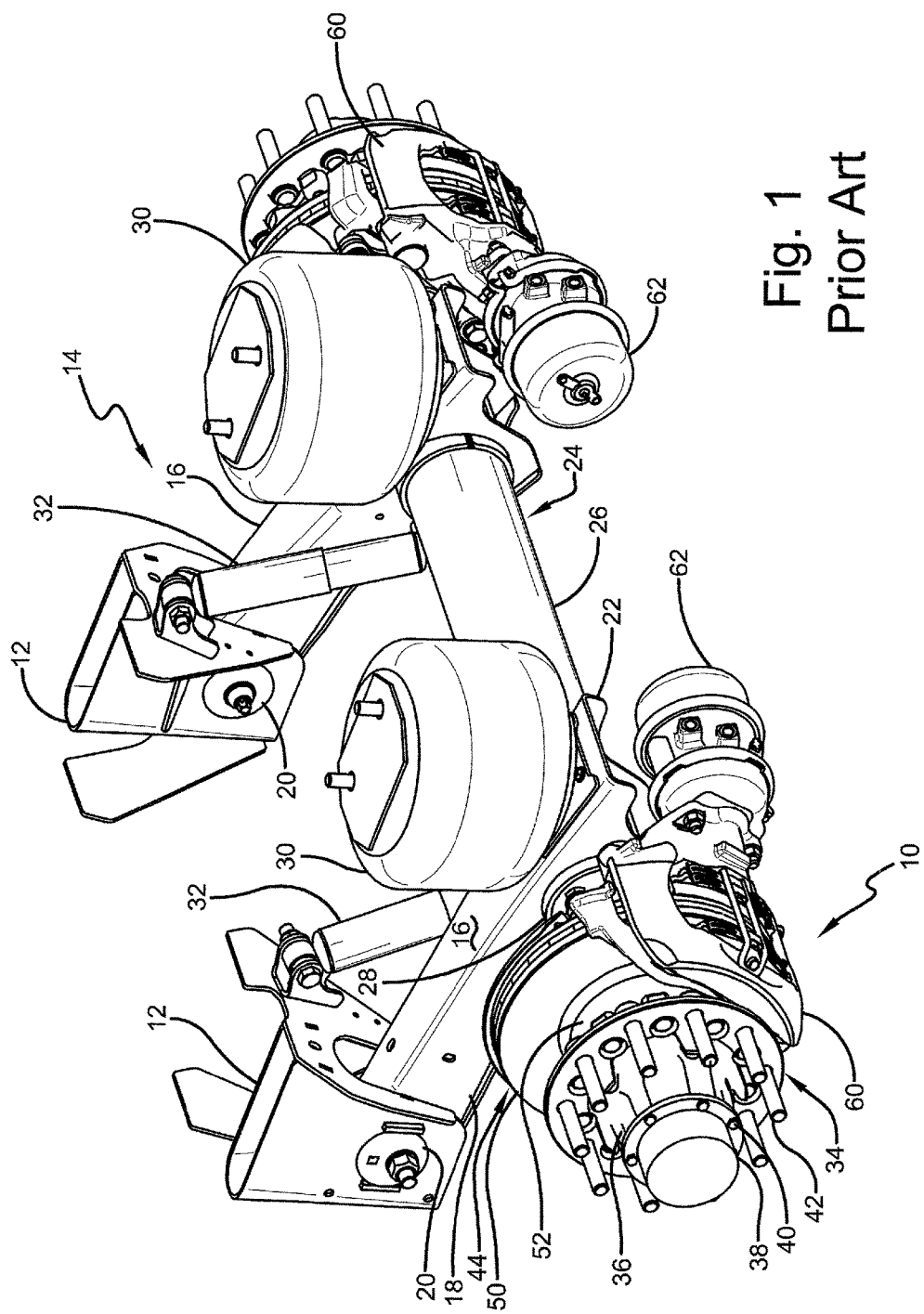
FIG. 1 is an overall perspective view of an axle/suspension system with components of a prior art air disc brake system.

The disclosed subject matter is described with reference to the drawings, in which like reference numerals are used to refer to like elements throughout the description. For exemplary purposes, details are set forth in order to provide an understanding of the disclosed subject matter. It will be understood, however, that the disclosed subject matter can be practiced and implemented without these specific details.

In order to better understand the apparatus for mounting components of an air disc brake actuator for heavy-duty vehicles and the environment in which it operates, an exemplary prior art air disc brake system 10 for heavy-duty vehicles will be described and illustrated in FIG. 1. Heavy-duty vehicles include trucks, trailers, tractor-trailers or semi-trailers. Reference shall be made generally to a heavy-duty vehicle for the purpose of convenience, with the understanding that such reference includes trucks, trailers, tractor-trailers and/or semi-trailers.

A pair of transversely spaced hangers 12 is mounted on and depends from members of a frame or subframe (not shown) of a heavy-duty vehicle. An axle/suspension system 14 is pivotally connected to the transversely spaced hangers 12 via a pair of transversely-spaced apart trailing arm beams 16. Each trailing arm beam 16 includes a front end 18 having a bushing assembly 20, which includes a bushing, pivot bolts and washers as is known, to connect the beam to a respective one of the hangers 12. Each beam 16 also includes a rear end 22, which is welded or otherwise rigidly attached to a transversely-extending axle 24. The axle 24 includes a central tube 26 generally extending between the beams 16.

Each one of a pair of axle spindles 28 (FIG. 2) is attached to a respective one of the ends of the central tube 26 and extends outboard from a respective one of the ends of the central tube. The axle/suspension system 14 typically includes a pair of air springs 30. Each of the air springs 30 extends between and is mounted on the rear end 22 of a respective one of the beams 16 and a respective one of the heavy-duty vehicle frame or subframe members. Each one of a pair of shock absorbers 32 extends between and is mounted on a respective one of the beams 16 and a respective one of the hangers 12.

A wheel end assembly 34 is mounted on a respective one of the axle spindles 28. For the purposes of convenience and clarity, only one axle spindle 28 and its respective wheel end assembly 34 will be described. The wheel end assembly 34 includes a bearing assembly having an inboard bearing (not shown) and an outboard bearing (not shown) mounted on the outboard end of the axle spindle 28. A wheel hub 36 is mounted on the inboard and outboard bearings for rotation relative to the axle spindle 28, as is known. A spindle nut assembly (not shown) threadably engages the outboard end of the axle spindle 28 and secures the wheel hub 36 and bearings in place.

A hub cap 38 is mounted on the outboard end of the wheel hub 36 by a plurality of fasteners 40. Each one of the fasteners 40 passes through a respective one of a plurality of openings formed in the hub cap, and threadably engages a respective one of a plurality of aligned threaded openings (not shown) that are formed in the wheel hub 36. In this manner, the hub cap 38 closes the outboard end of the wheel end assembly 34. A main continuous seal (not shown) is rotatably mounted on the inboard end of the wheel end assembly 34 and closes the inboard end of the wheel end assembly to maintain lubricant in the wheel end assembly, as is known. In a typical heavy-duty vehicle wheel configuration, a plurality of threaded bolts 42 and mating nuts (not shown) are used to mount one tire rim or a pair of tire rims (not shown), depending on specific design considerations, on the wheel end assembly 34. A tire (not shown) is mounted on respective ones of the tire rims, as is known.

The air disc brake system 10 includes a rotor 44. The rotor 44 includes a radially-extending mounting portion or flange 46, which is formed with openings to receive suitable fasteners 48, such as bolts. The hub 36 is formed with corresponding openings, thereby enabling the fasteners 48 to pass through aligned ones of the hub openings and the rotor flange openings to removably secure rotor 44 to the hub. This construction enables rotor 44 to rotate with hub 36, while being removable from the hub for servicing.

Figure 2:
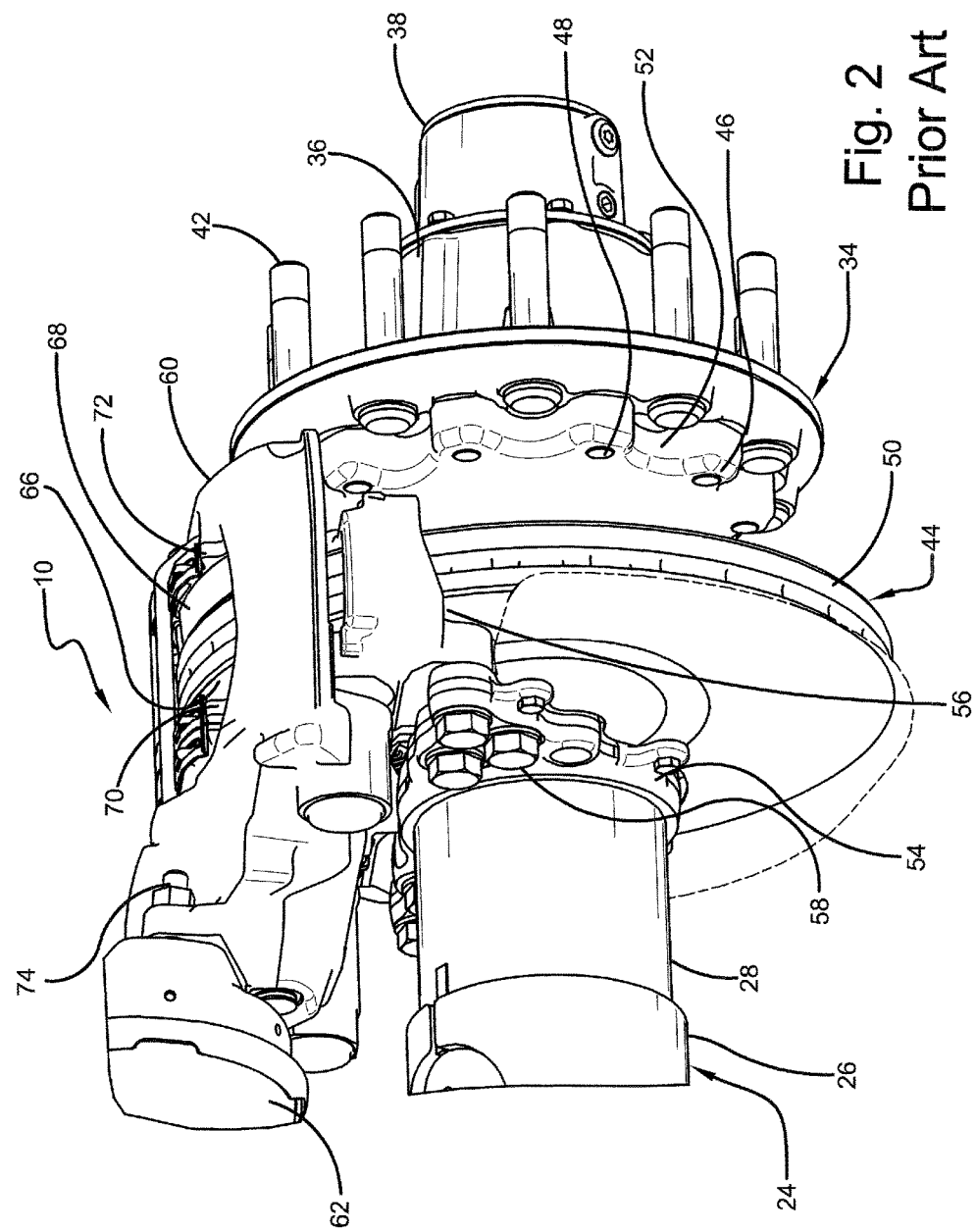
FIG. 2 is a fragmentary perspective view from an inboard side of the prior art air disc brake system illustrated in FIG. 1.

The rotor 44 also includes a radially extending disc portion 50 (FIGS. 1-2). An axially-extending sleeve 52 of the rotor 44 is integrally formed with and extends between the disc portion 50 of the rotor 44 and the mounting flange 46. The sleeve 52 of the rotor 44 enables the disc portion 50 of the rotor 44 to be rigidly connected to the mounting flange 46 and, thus, the wheel end assembly 34. A torque plate 54 is welded or otherwise rigidly attached to the axle spindle 28. A carrier 56 of the disc brake system 10 is mechanically fastened to the torque plate 54 by bolts 58 or other mechanical means. The carrier 56 supports a caliper 60. The caliper 60 is formed with a bore (not shown) for receiving one or more pistons (not shown) and an actuator 62.

The actuator 62 (FIG. 3) typically includes a brake chamber, which is in fluid communication with a compressed air source (not shown) of the heavy-duty vehicle and activates movement of the piston(s) (not shown) through a pushrod (not shown) of the actuator. The actuator 62 is mounted on the caliper 60 in a cantilevered fashion by a pair of mounting studs 74. The caliper 60 also includes an outboard pad seat (not shown) that is disposed opposite the piston(s), as known. An outboard brake pad 66 includes friction material that is mounted on an outboard backing plate 70. An inboard brake pad 68 includes friction material that is mounted on an inboard backing plate 72. Each one of the pair of brake pads 66, 68 is seated in the caliper 60, with the inboard pad 68 being adjacent the piston(s) and the outboard pad 66 being adjacent the outboard pad seat. Upon actuation by actuator 62, the piston(s) and the outboard pad seat cooperate to control movement of the brake pads 68, 66, respectively.

An inboard surface of disc portion 50 of the rotor 44 is located adjacent the friction material of the inboard brake pad 68. An outboard surface of the disc 50 of the rotor 44 is located adjacent the friction material of the outboard brake pad 66. During travel of the heavy-duty vehicle, when the air disc brake system is actuated, compressed air flows to the brake chamber of the actuator 62, which effects movement of the piston(s) and outboard pad seat through the push rod. This movement in turn forces the friction material of each respective pad 68, 66 against a corresponding one of the inboard and outboard surfaces of the disc portion 50 of the rotor 44, respectively, slowing and/or stopping rotation of the rotor 44, thereby slowing and/or stopping rotation of the vehicle wheel.

The prior art actuator 62 is attached directly to the caliper 60 in a cantilevered fashion by a pair of mounting studs 74, employing no other structural support. This attachment of the actuator 62 directly to the caliper 60 provides less than optimum support of the actuator and creates stress on the caliper. To enable caliper 60 to have sufficient strength, rigidity and mass to support such a cantilevered mounting of actuator 62, the size and weight, and thus the cost of the caliper, may be undesirably high. As is known, increased weight can lead to increased fuel consumption, which in turn increases the operating costs of the heavy-duty vehicle. The actuator 62 is typically mounted on the inboard side of caliper 60. This arrangement results in the actuator 62 being located behind and/or beneath the beam 16 of axle/suspension system 14. This location potentially creates an undesirable level of clearance between brake chamber of the actuator 62 and the ground, which can potentially result in the brake chamber of the actuator being damaged by hitting the ground or being struck with road debris.

As a result, there is a need for an actuator to be mounted in a manner that provides improved structural support of the actuator and improved protection of the actuator. It also would be advantageous to potentially reduce the size, weight and cost of the caliper. The structure for mounting of an air disc brake actuator according to at least one aspect of the subject disclosure satisfies these needs.

Figure 4:
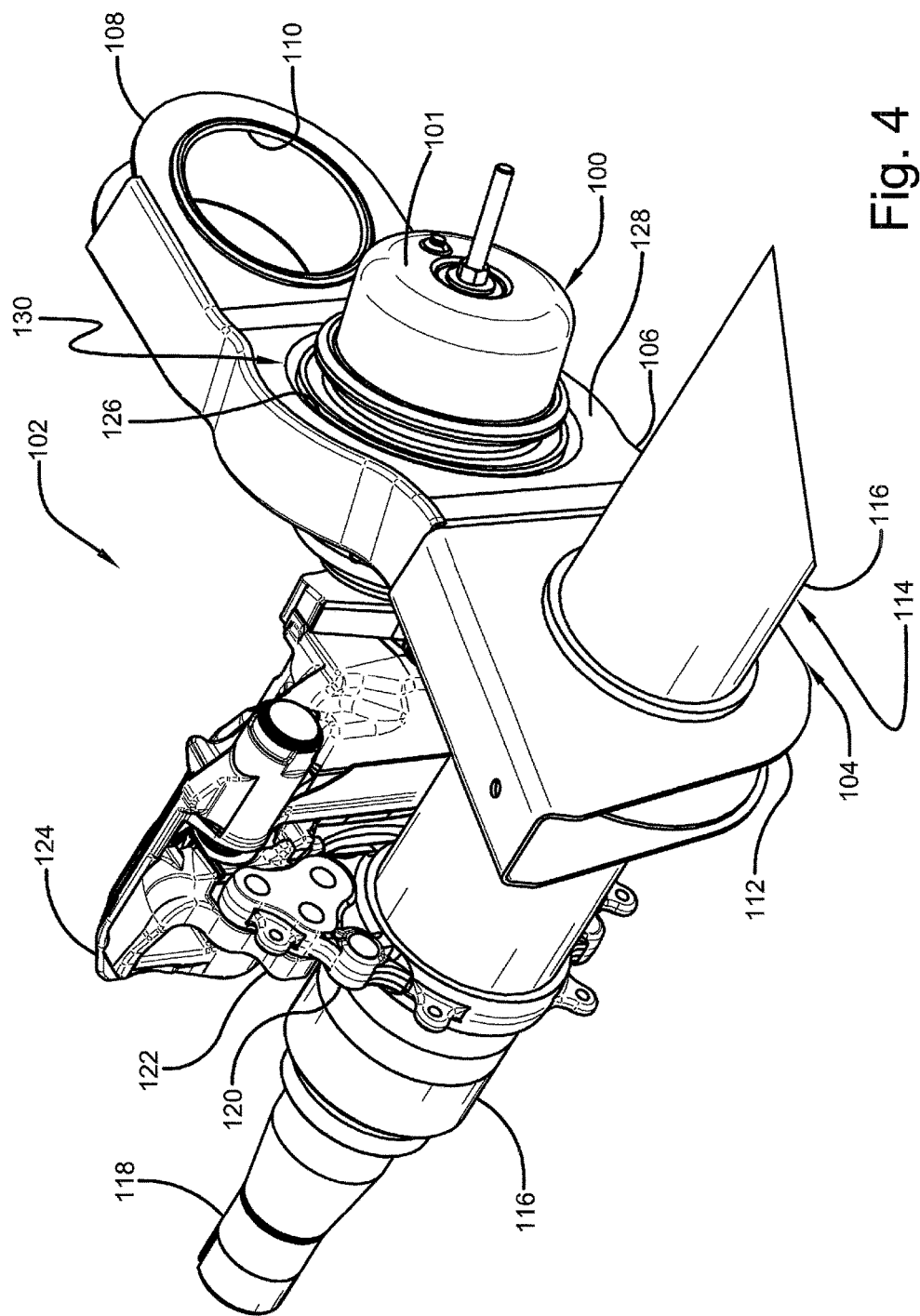
FIG. 4 is a fragmentary perspective view from an inboard side of an air disc brake system, constructed according to an aspect of the subject disclosure, for mounting a brake chamber of a brake actuator with components of an axle/suspension system.
Figure 5:
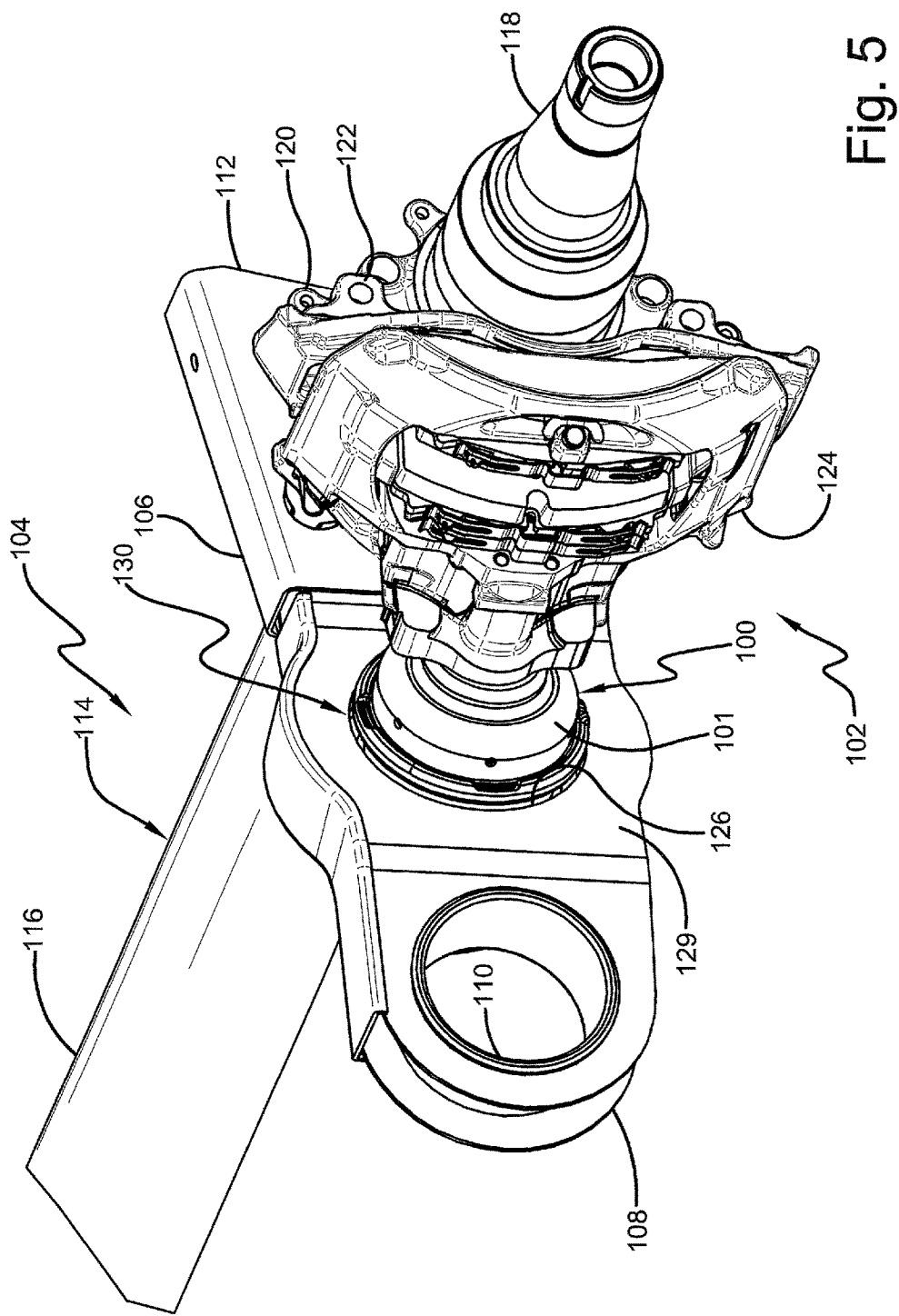
FIG. 5 is a fragmentary perspective view from an outboard side of the air disc brake system illustrated in FIG. 4.

An exemplary aspect of a structure 130 (FIGS. 4-5) for mounting of a brake actuator 100, according to an aspect of the subject disclosure, is incorporated into an air disc brake system 102 and components of an axle/suspension system 104. The axle/suspension system 104 includes a pair of longitudinally-extending, transversely-spaced trailing arm beams 106 (only one shown). Each beam 106 includes a front end portion 108 with an opening 110 to receive a bushing assembly (not shown) to pivotally connect the beam to a hanger, as is known. Each beam 106 also includes a trailing or rear end portion 112, which is welded or otherwise rigidly attached to a transversely-extending axle 114. The axle 114 includes an axle central tube 116 that extends between the beams 106. Each one a pair of spindles 118 is attached to a respective one of the axially opposite ends of the axle central tube 116 and extends outboard from a respective one of the beams 106 and ends of the central tube. The beam 106 may have an inverted U-shape cross-section or a rectangular cross-section taken in a direction substantially parallel to the axle.

Figure 6:
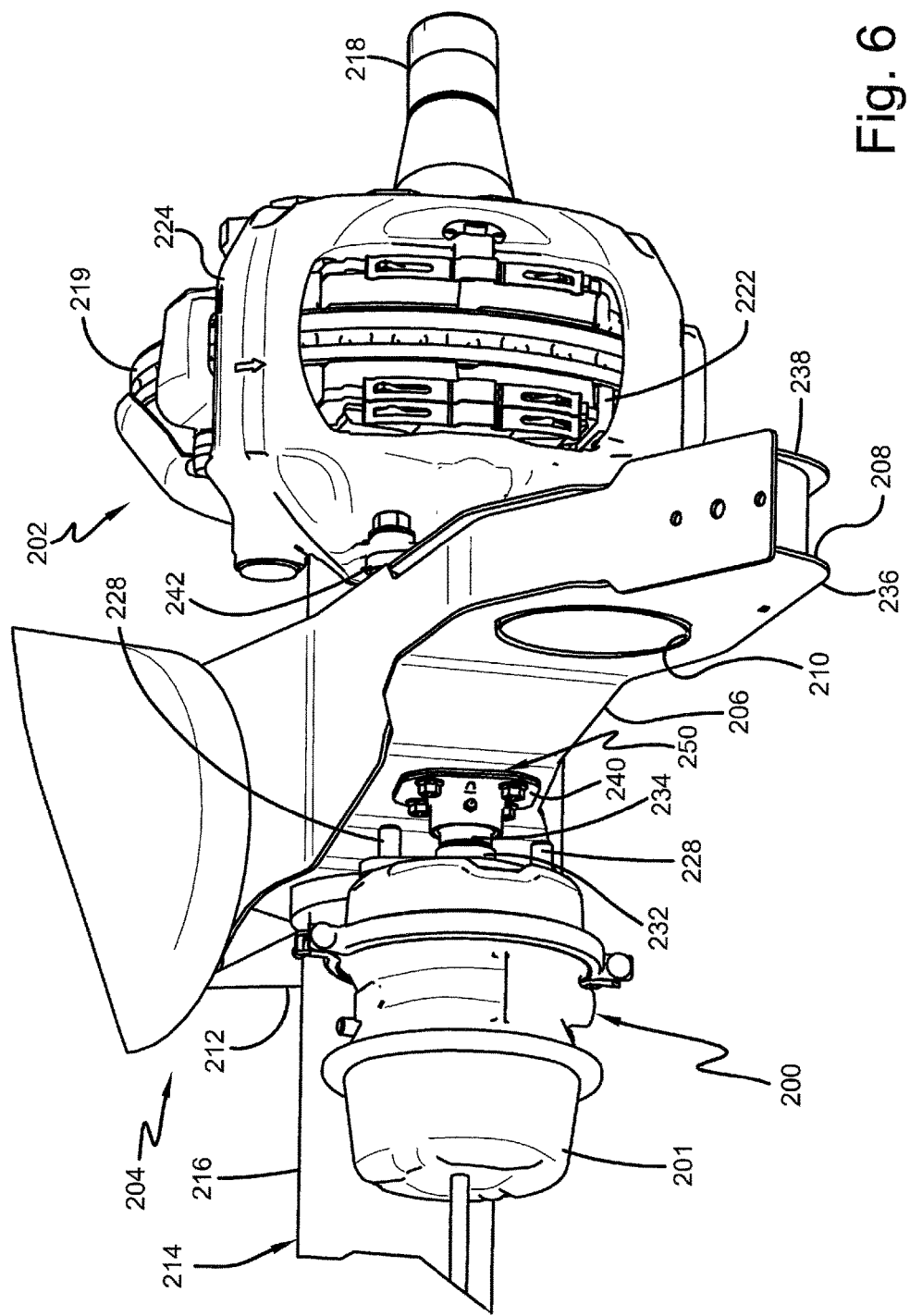
FIG. 6 is a fragmentary perspective view from a forward inboard side of an air disc brake system, according to another aspect of the subject disclosure, for mounting a brake actuator on components of an axle/suspension system.
Figure 7:
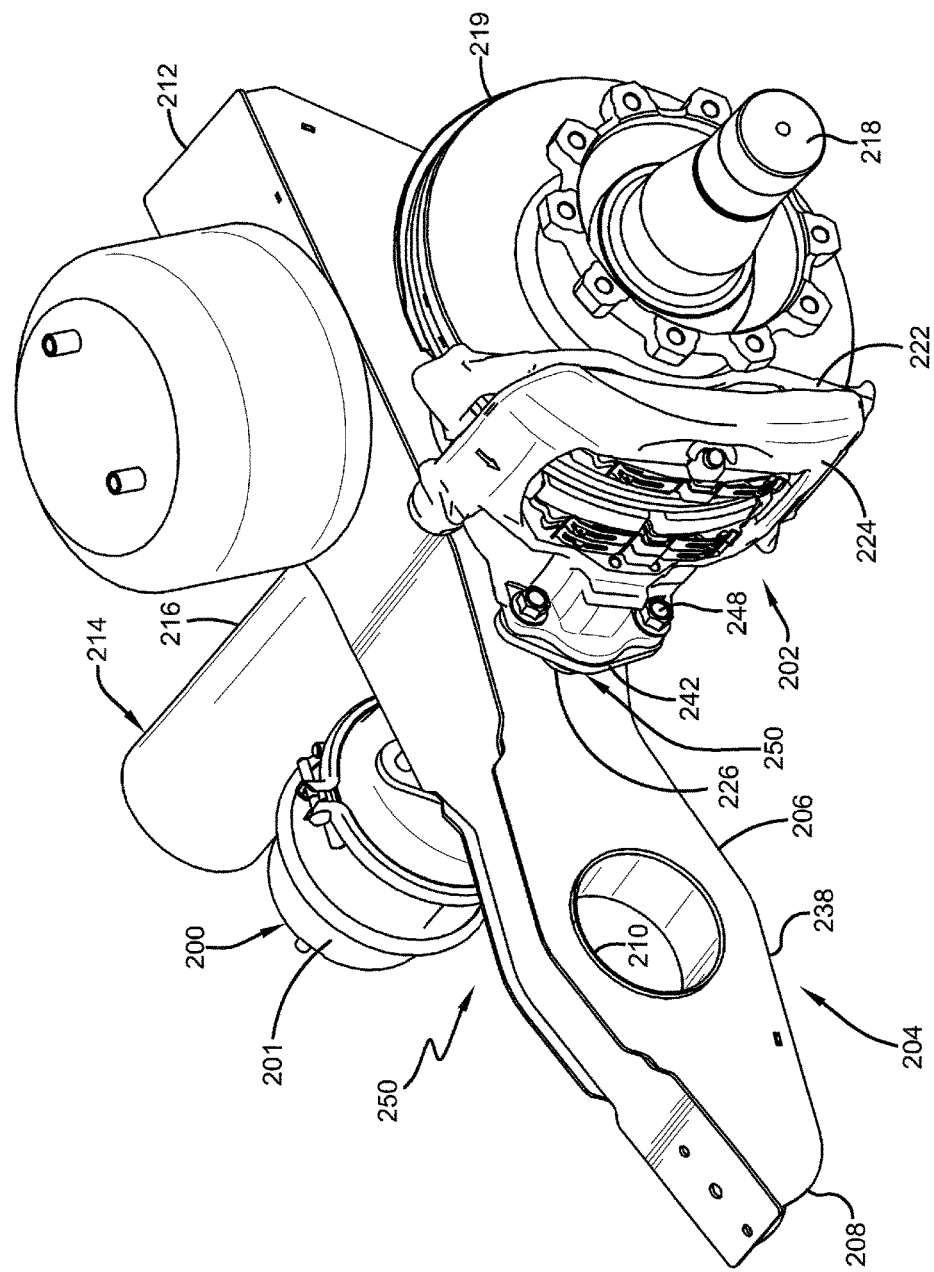
FIG. 7 is a fragmentary perspective view from an upper outboard side of the air disc brake system illustrated in FIG. 6.
Figure 8:
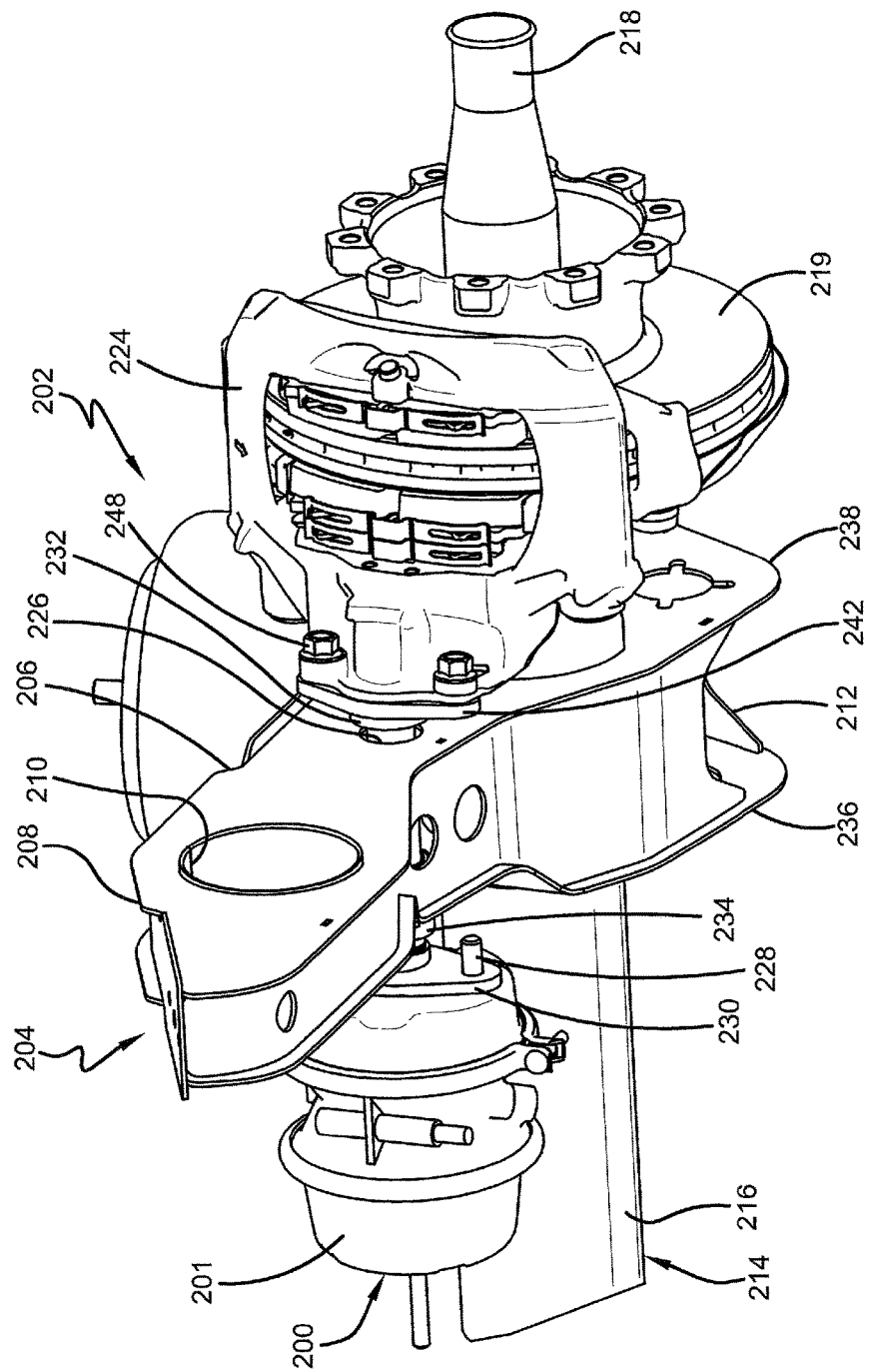
FIG. 8 is a fragmentary perspective view from a lower outboard side of the air disc brake system illustrated in FIG. 6.

A wheel end assembly (not shown) is mounted on each one of the axle spindles 118. For the purposes of convenience and clarity, only one of the ends of the axle/suspension system 104 will be described. A torque plate 120 is welded or otherwise rigidly attached to the axle spindle 118 or axle 114. The air disc brake system 102 includes a rotor 219 (FIGS. 6-7). The rotor 219 is rigidly connected to a hub (not shown) of the wheel end assembly, as is known. A carrier 122 of the air disc brake system 102 is mechanically fastened to the torque plate 120 by bolts (not shown) or other mechanical means. The carrier 122 supports a caliper 124. The caliper 124 is formed with a bore (not shown) for operably receiving one or more pistons (not shown) and at least a portion of an actuator 100. An air or brake chamber portion 101 of the brake actuator 100 is in fluid communication with a compressed air source (not shown) and activates movement of the piston(s). It will be appreciated that in some air disc brake assembly constructions, the caliper may be mounted to a torque plate without affecting the concept or implementation of the disclosed subject matter.

Figure 3:
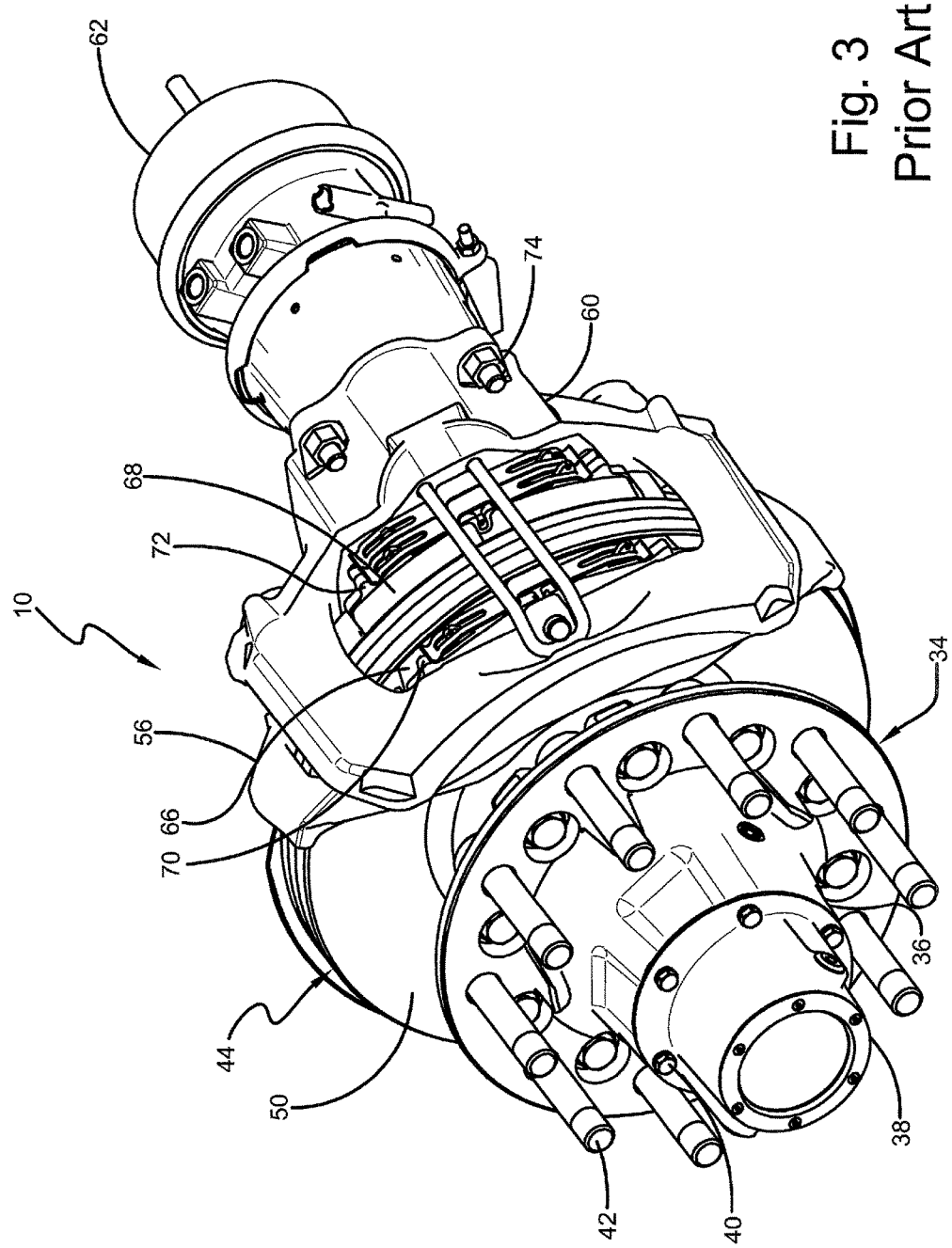
FIG. 3 is a perspective view from an outboard side of the prior art air disc brake system illustrated in FIG. 1.

An important feature of this aspect of the disclosed subject matter is the brake chamber portion 101 of the actuator 100 being mounted in and supported by structure 130 of the beam 106. That is, the brake chamber portion 101 of the actuator 100 is received in and supported by surfaces of a pair of aligned openings 126, which are formed in an inboard sidewall 128 and an outboard sidewall 129, respectively, of the beam 106. The pair of openings 126 is located in the beam 106 between the front end portion 108 and the rear end portion 112. The brake chamber portion 101 of the actuator 100 may be attached to the structure 130 of the beam 106 in a suitable manner, such as welding or by other retaining components. In this manner, the structure 130 for mounting of a brake chamber portion 101 of the actuator 100 is formed entirely by the beam 106 of the axle/suspension system 104. The actuator generally has structure (not shown) with relatively low weight mounted to the caliper 124, such as by a threaded connection. Thus, the majority of the weight of the actuator 100 is supported by the structure 130 incorporated into the beam 106 upon activation of the brake. The brake chamber portion 101 of the actuator 100, thus, employs the structure 130 of the axle/suspension system 104 incorporated into the beam 106 to receive and support the brake chamber portion of the actuator remotely, away from the caliper 124. The structure for mounting of a brake chamber portion 101 of the actuator 100, thus, does not employ a completely cantilevered mounting configuration, such as the one used for the prior art brake chamber 62 (FIG. 3). Such a structure 130 for mounting of a brake chamber portion 101 of the actuator 100 of the subject disclosure integrates the axle/suspension system 104 and the air disc brake system 102.

The structure 130 for remote mounting of a brake chamber portion 101 of the actuator 100 of the subject disclosure, by utilizing components of the axle/suspension system 104, eliminates the need to add structure, mass, and weight to caliper 124 to support the brake chamber portion 101 of the actuator 100, resulting in weight and cost savings. The mounting location of brake chamber portion 101 of the actuator 100 on, and at least partially within, beam 106 better protects the brake chamber portion 101 from being struck by road debris. Furthermore, the structure 130 for mounting of the brake chamber portion 101 of the actuator 100 permits location of the caliper 124 for the disc brake assembly ahead of the axle spindle 118. The structure 130 also has a portion of the beam 106 encapsulating a portion of the actuator 100, such as the brake chamber 101, to offer the protection and to raise the actuator from the location that an actuator would normally have in prior art air disc brake mounting arrangements. Such a raised location minimizes or eliminates the possibility of the actuator striking the ground or road during operation of the vehicle.

An assembly 250 for mounting a brake actuator 200 (FIGS. 6-9), according to another aspect of the subject disclosure, is incorporated into an air disc brake system 202. The mounting assembly 250 for the brake actuator 200 is illustrated connected with components of an axle/suspension system 204. The axle/suspension system 204 includes a pair of longitudinally-extending, transversely-spaced trailing arm beams 206. Specifically, each trailing arm beam 206 includes a front end 208 having an opening 210 formed to receive a bushing assembly (not shown), as is known. The bushing facilitates pivotal connection of the beam to a respective one of hangers (not shown). Each beam 206 also includes a rear end 212, which is welded or otherwise rigidly attached to an end portion of a transversely-extending axle 214. The beam 206 may have an inverted U-shape cross-section or a rectangular cross-section taken in a direction substantially parallel to the axle. The axle 214 includes a central tube 216 generally extending between the beams 206. Each one a pair of spindles 218 is attached to a respective one of the ends of the central tube 216 and extends outboard from a respective one of the beams 206.

A wheel end assembly (not shown) is mounted on each one of the axle spindles 218. For the purposes of convenience and clarity, only one end of the axle/suspension system 204 will be described. The air disc brake system 202 includes a rotor 219. The rotor 219 is rigidly connected to a hub (not shown) of the wheel end assembly, as is known. A torque plate is welded or otherwise rigidly attached to the axle spindle 218, and a carrier 222 of the disc brake system 202 is mechanically fastened to the torque plate by bolts 248 or other mechanical means, as is known. The carrier 222 supports a caliper 224. The caliper 224 is formed with a bore (not shown) for receiving one or more pistons (not shown). The actuator 200 is in fluid communication with a compressed air source (not shown) and activates movement of the piston(s) within the caliper 224.

In accordance with an important feature of this aspect of the subject disclosure, the actuator 200 (FIGS. 6 and 8) is mounted on a pair of studs 228. The studs 228 are rigidly attached to an actuator adapter plate 230 that is in turn secured to an inboard end of a through-tube 232. The through-tube 232 extends through the beam 206 to the caliper 224.

The beam 206 is formed with a pair of aligned openings 226. The openings 226 are formed in an inboard sidewall 236 and an outboard sidewall 238, respectively, of beam 206, between the beam front end 208 and the beam rear end 212. A support tube 234 is disposed in the opening 226 in beam inboard sidewall 236, and is secured to the inboard sidewall by mounting plates 240, such as a bracket structure disclosed in U.S. Pat. No. 7,537,224, owned by the same assignee as the subject disclosure, Hendrickson USA, L.L.C. The support tube 234 may also function as a linear bearing. The mounting plates 240 are rigidly attached to the beam 206 inboard sidewall 236 adjacent the opening 226. Support tube 234 provides stable mounting and alignment of through-tube 232, as the through-tube is received in and passes through the support tube.

Figure 9:
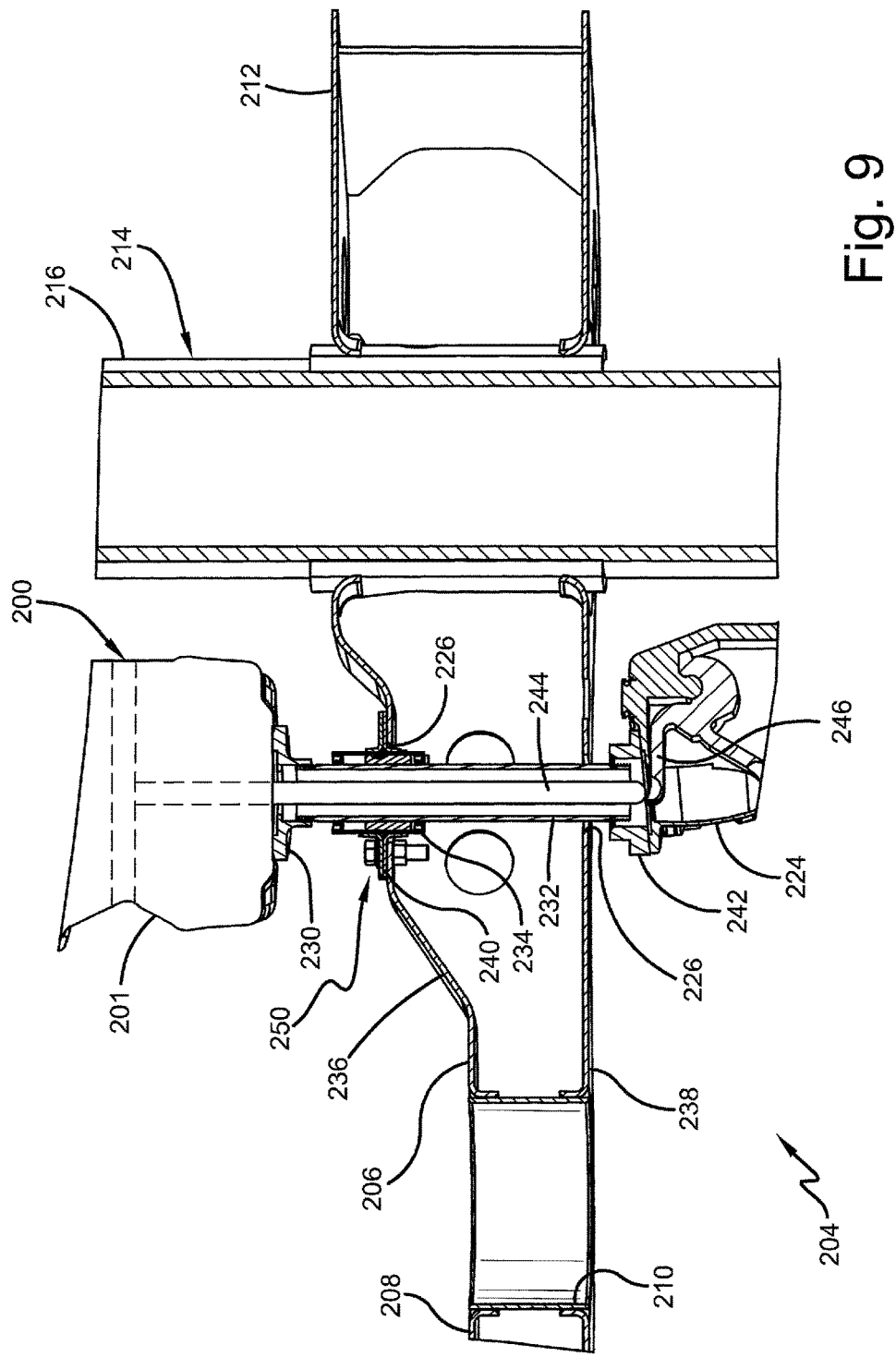
FIG. 9 is a top view, partly in cross-section, of certain components of the air disc brake system illustrated in FIG. 6.

An outboard end of the through-tube 232 is attached to an adapter plate 242, which is rigidly mounted on caliper 224 (FIG. 9). A pushrod 244 of the actuator 200 extends outboard from a brake chamber 201 of the brake actuator 200, through the inner diameter of through-tube 232, and to a lever 246 of caliper 224. The lever 246 actuates movements of the brake pads (not shown). Pushrod 244, thus, is protected and supported inside through-tube 232 that is within the beam 206.

The through-tube 232 can move transversely linearly as the caliper 224 moves to account for wear of the brake pads (not shown). In this manner, the brake actuator 200 according to this aspect provides through-tube 232 to act as a linear bearing, as the through-tube is capable of moving about an inch over the life of the brake pads to account for pad wear. In this aspect, the brake chamber portion of the brake actuator 200 is fixed to a surface of the beam 206. The through-tube 232 is operably connected with the brake chamber 201 of the brake actuator 200. The pushrod 244 extends through the through-tube 232 to actuate the air disc brake upon movement of the pushrod a sufficient amount.

Thus, in accordance with an advantage of the subject disclosure, the mounting assembly 250 for the majority of the weight of the brake actuator 200 of the subject disclosure, constructed according to this aspect, is supported by the beam 206, and thus is supported by a structure of axle/suspension system 204. The mounting assembly 250 for the brake actuator 200 of the subject disclosure, thus, employs a structure of the axle/suspension system 204, such as the beam 206, to support the majority of the weight of the brake actuator remotely, away from the caliper 224. The mounting assembly 250 for the brake actuator 200 of the subject disclosure, thus, does not employ a completely cantilevered mounting configuration based on the caliper, such as the one used for prior art actuator 62 (FIGS. 1-3). Such a structure or mounting assembly 250 for the brake actuator 200 of the subject disclosure integrates the axle/suspension system 204 and the air disc brake system 202. The mounting assembly 250 for the brake actuator 200 of the subject disclosure, by utilizing components of axle/suspension system 204, eliminates the need to add strengthening structure, mass, and weight to caliper 224 to support components of the actuator 200, resulting in weight and cost savings. The mounting location of the actuator 200 inboard of and adjacent to the beam 206 better protects the brake chamber from debris and minimizes potential contact with the ground or road during operation of the vehicle.

The above-described assembly for remote mounting of at least some components of an actuator 100, 200 according to the subject disclosure provides more secure support of the actuator when compared to the mounting scheme for the prior art brake chamber 62. Such improved support of brake actuator 100, 200 desirably reduces the stresses on the caliper 124, 224 and the possible displacement of the brake actuator due to road vibration inputs. Because the stress on caliper 124, 224 is reduced, it may be possible to decrease the size of the caliper, thereby desirably reducing the weight and cost of the caliper, in turn potentially reducing the associated cost of vehicle operation.

An air disc brake actuator 100, 200 mounting structure or assembly 130, 250, respectively, is for use with a heavy-duty vehicle and is formed by or to a beam 106, 206 of an axle/suspension assembly. The disclosed subject matter successfully incorporates a relatively lightweight air disc brake actuator 100, 200 mounting assembly 130, 250 into a beam 106, 206 of an axle/suspension system 104, 204 for heavy-duty vehicles. The disclosed subject matter can save weight by eliminating some mass of the casting of the caliper/carrier, yet still provide the requisite stopping ability and durability that is required in the cargo transportation industry. It will be appreciated that the actuator 100, 200 may be attached to sidewalls 128 and 129 or 236 and 238 of the beam 106, 206 or with suitable intervening structure for receiving and supporting the actuator.

Accordingly, the improved air disc brake actuator 100, 200 mounting structure or assembly 130, 250, respectively, is simplified, provides an effective, inexpensive, and efficient structure which eliminates difficulties, disadvantages and drawbacks encountered with prior art air chamber mountings.

In addition, the improved support of brake actuator 100, 200 by the structure or assembly 130, 250, respectively, for remote mounting of the brake actuator of the subject disclosure may improve the life of components of air disc brake system 102, 202, which may desirably lengthen the time between service intervals. When service of air disc brake system 102, 202 is required, the mounting structure or assembly 130, 250 for the brake actuator 100, 200 of the subject disclosure allows for components such as caliper 124, 224 or rotor 219 (FIG. 7) to be removed without the need to remove an associated brake actuator. This allows for more manageable servicing, and reduces the total weight of the components being removed by a service technician. The structure or assembly 130, 250 for mounting of the brake actuator 100, 200 of the subject disclosure also facilitates the use of a brake pad wear indicator to communicate the need to service the brakes.

Moreover, as opposed to prior art brake actuator 62 that is located behind or beneath axle/suspension system beam 16, the mounting structure or assembly 130, 250, respectively, of the subject disclosure enables at least some components of the brake actuator 100, 200 to be located on or within the beam 106, 206, thereby providing a protected location and increased clearance between the brake actuator and the ground. Such increased clearance reduces the chance that brake actuator 100, 200 may be damaged by hitting the ground or being struck with road debris.

The structure or assembly 130, 250, respectively, for mounting of the brake actuator 100, 200 of the subject disclosure may also enable improved air supply to the brake actuator. For example, in the prior art, flexible air lines (not shown) extend from the vehicle air supply (not shown), which is typically situated between two axle/suspension systems 14 (FIG. 1) on a tandem axle slider system, to the prior art brake actuator 62. Because the air lines are secured by each respective manufacturer of the heavy-duty vehicle, the manner in which they are secured may vary greatly across the industry. The unique mounting configuration of the structure or assembly 130, 250 for mounting of the brake actuator 100, 200 of the subject disclosure enables the connection of the air supply to the brake actuator to be reconfigured, thereby desirably providing more consistency and standardization in the manner of securing the air lines and optimizing the location of the air lines for protection from road debris.

The structure or assembly 130, 250, respectively, for mounting of a brake actuator 100, 200 of the subject disclosure may also provide improved adjustment of air disc brake system 102, 202. The prior art air disc brake system 10 allows for the brake to adjust due to brake lining wear by employing the caliper 60 that translates during brake applications and over the life of axle/suspension system 14. The movement of the prior art caliper 60 occurs between the caliper and the carrier 56, which connects the caliper with the axle 24 and has a linear guide system. The assembly 250 for mounting of a brake actuator 200 of the subject disclosure accommodates such movement by allowing for linear translation in the attachment mechanism, such as through-tube 232, between the brake chamber, axle/suspension system 204 and caliper 224. Alternatively, the assembly 130 for mounting of the brake actuator of the subject disclosure may accommodate such movement by allowing for the brake adjustment to occur within a separate mechanism (not shown).

Accordingly, the improved air disc brake actuator 100, 200 mounting structure or assembly 130, 250, respectively, is simplified, provides an effective, safe, inexpensive, and efficient structure which eliminates difficulties, disadvantages and drawbacks encountered with prior art air chamber mountings. The subject disclosure may also include a method of mounting a brake actuator 100, 200 for an air disc brake system 102, 202 for heavy-duty vehicles. The method includes steps in accordance with the description that is presented above and shown in FIGS. 4-9.

It is to be understood that the structure and arrangement of the above-described structure or assembly 130, 250, respectively, for mounting of an air disc brake actuator 100, 200 of the subject disclosure may be altered or rearranged without affecting the overall concept or operation of the subject disclosure. In addition, the structure or assembly 130, 250 for mounting of an air disc brake actuator 100, 200 of the subject disclosure may be employed with other types of axles, wheel end assemblies, axle/suspension systems, and/or brake systems than those shown and described, without affecting the overall concept, function or operation of the subject disclosure. For example, in the above description, the brake system is described as including a torque plate that is rigidly connected to an axle, and is also attached to a carrier by bolts, which in turn supports a caliper. Other brake system configurations may be employed without affecting the overall concept or operation of the subject disclosure, such as the use of an integrated, single-component carrier and torque plate. Moreover, while reference has been made generally to a heavy-duty vehicle for the purpose of convenience, it has been with the understanding that such reference includes trucks, trailers, tractor-trailers and semi-trailers.

The subject disclosure has been described with reference to specific aspects. It is understood that this description and illustration is by way of example and not by way of limitation. Potential modifications and alterations will occur to others upon a reading and understanding of this disclosure, and it is understood that the subject disclosure includes all such modifications and alterations and equivalents thereof.

What is claimed is:

1. An air disc brake system for a heavy-duty vehicle, the air disc brake system comprising:
   an axle;
   a spindle attached to an end portion of the axle;
   an air disc brake assembly having at least a portion adapted to be supported by the spindle;
   a suspension beam having an axle support portion connectable with the axle;
   an end portion of the suspension beam spaced from the axle support portion for attachment with the heavy-duty vehicle, the suspension beam being pivotable about the end portion of the suspension beam;
   a brake actuator for actuating the air disc brake assembly, the brake actuator including a brake chamber; and
   structure of the suspension beam configured to directly support at least a portion of the brake chamber.

2. The air disc brake system of claim 1 wherein the suspension beam has a surface defining an opening for receiving and supporting at least a portion of a brake chamber of the brake actuator.

3. The air disc brake system of claim 1 further including the brake actuator having a movable member to actuate the air disc brake assembly, wherein the suspension beam has a surface defining an opening through which at least a portion of the movable member may extend to actuate the air disc brake system upon linear movement.

4. The air disc brake system of claim 3 wherein the brake actuator is supported by the suspension beam such that the movable member extends in a direction substantially parallel to the direction that the axle extends.

5. The air disc brake system of claim 1 wherein the majority of the weight of the brake actuator is free from support by the air disc brake assembly.

6. The air disc brake system of claim 1 wherein at least a portion of the brake actuator is located on a first side of the suspension beam and at least a portion of the air disc brake assembly is located on an opposite second side of the suspension beam.

7. The air disc brake system of claim 1 wherein the structure of the suspension beam configured to support the brake chamber is located between the axle support portion and the end portion of the suspension beam.

8. An air disc brake system for a heavy-duty vehicle that has an axle, a spindle attached to an end portion of the axle, and at least a portion of an air disc brake assembly being supported by the spindle, the air disc brake system comprising:
   a suspension beam having an axle support portion connectable with the axle;
   an end portion of the suspension beam spaced from the axle support portion, the suspension beam being supported for pivotal movement at the end portion of the suspension beam;
   a brake actuator for actuating the air disc brake assembly, the brake actuator including a brake chamber;
   structure of the suspension beam configured to directly support the brake chamber of the brake actuator; and
   a surface defining an opening in the suspension beam for receiving at least a portion of the brake chamber of the brake actuator.

9. The air disc brake system of claim 8 further including the brake actuator having a movable member to actuate the air disc brake assembly, wherein the movable member may extend through the opening in the suspension beam to actuate the air disc brake system upon linear movement.

10. The air disc brake system of claim 9 wherein the brake actuator is supported by the suspension beam such that the movable member extends substantially parallel to the extent of the axle.

11. The air disc brake system of claim 8 wherein at least a portion of the brake actuator is located on a first side of the suspension beam and at least a portion of the air disc brake assembly is located on an opposite second side of the suspension beam.

12. The air disc brake system of claim 8 wherein the structure configured to directly support the brake chamber of the brake actuator is located between the axle support portion and the end portion of the suspension beam.

13. The air disc brake system of claim 8 wherein the majority of the weight of the brake actuator is free from support by the air disc brake assembly.

14. An air disc brake actuator mounting for a heavy-duty vehicle, the air disc brake actuator mounting comprising:
   a suspension beam having structure for attachment to an axle of the heavy-duty vehicle;
   an end portion of the suspension beam spaced from the axle attachment structure and adapted to be supported to enable pivotal movement of the axle; and
   structure of the suspension beam configured to directly support at least a portion of a brake chamber of an air disc brake actuator.

15. The air disc brake actuator mounting of claim 14 wherein the suspension beam has a surface for receiving at least a portion of a brake chamber of the air disc brake actuator and for supporting the brake chamber.

16. The air disc brake actuator mounting of claim 14 further including a movable member portion of the air disc brake actuator and wherein the suspension beam has a surface defining an opening through which the movable member may extend to actuate an air disc brake assembly upon linear movement in a direction parallel to the axle.

17. The air disc brake actuator mounting of claim 14 wherein the structure of the suspension beam for configured to support at least a portion of the air disc brake chamber is located on the suspension beam intermediate of structure for attachment to an axle and the end portion of the suspension beam.

18. The air disc brake actuator mounting of claim 14 wherein the majority of the weight of the brake chamber of the brake actuator is supported by the suspension beam.

19. An air disc brake system for a heavy-duty vehicle, the air disc brake system comprising:
   an axle;
   a spindle attached to an end portion of the axle;
   an air disc brake assembly having at least a portion adapted to be supported by the spindle;
   a suspension beam having an axle support portion connectable with the axle;
   an end portion of the suspension beam spaced from the axle support portion for attachment with the heavy-duty vehicle, the suspension beam being pivotable about the end portion of the suspension beam;
   a brake actuator for actuating the air disc brake assembly, the brake actuator including a brake chamber and a linearly moveable member, the linearly moveable member extending substantially parallel to the axle and being linearly moveable in a direction substantially parallel to the axle for actuating the air disc brake assembly; and
   structure of the suspension beam configured to support at least a portion of the brake chamber.

20. An air disc brake system for a heavy-duty vehicle, the air disc brake system comprising:
   an axle;
   a spindle attached to an end portion of the axle;
   an air disc brake assembly having at least a portion adapted to be supported by the spindle;
   a suspension beam having an axle support portion connectable with the axle;
   an end portion of the suspension beam spaced from the axle support portion for attachment with the heavy-duty vehicle, the suspension beam being pivotable about the end portion of the suspension beam;
   a brake actuator for actuating the air disc brake assembly; and
   structure associated with the suspension beam for supporting at least a portion of the brake actuator, wherein the suspension beam has a surface defining an opening for receiving and supporting at least a portion of a brake chamber of the brake actuator.

21. An air disc brake system for a heavy-duty vehicle that has an axle, a spindle attached to an end portion of the axle, and at least a portion of an air disc brake assembly being supported for rotation by the spindle; the air disc brake system comprising:
   a suspension beam having an axle support portion connectable with the axle;
   an end portion of the suspension beam spaced from the axle support portion, the suspension beam being supported for pivotal movement at the end portion of the suspension beam;
   a brake actuator for actuating the air disc brake assembly, the brake actuator including a brake chamber;
   structure associated with the suspension beam for supporting the brake chamber of the brake actuator; and
   at least a portion of a surface defining an opening in the suspension beam for receiving and supporting at least a portion of the brake chamber of the brake actuator.

22. An air disc brake actuator mounting for a heavy-duty vehicle, the air disc brake actuator mounting comprising:
   a suspension beam having structure for attachment to an axle of the heavy-duty vehicle;
   an end portion of the suspension beam spaced from the axle attachment structure and adapted to be supported to enable pivotal movement of the axle; and
   structure associated with the suspension beam for supporting at least a portion of a brake chamber of an air disc brake actuator, the structure having a surface for receiving and supporting at least a portion of the brake chamber of the air disc brake actuator.

* * * * *